United States Patent [19]

Lula et al.

[11] 4,277,374

[45] Jul. 7, 1981

[54] FERRITIC STAINLESS STEEL SUBSTRATE FOR CATALYTIC SYSTEM

[75] Inventors: Remus A. Lula, Natrona Heights; George Aggen, Sarver, both of Pa.

[73] Assignee: Allegheny Ludlum Steel Corporation, Pittsburgh, Pa.

[21] Appl. No.: 115,816

[22] Filed: Jan. 28, 1980

[51] Int. Cl.$^3$ .................. B01J 21/04; B01J 21/06; B01J 21/18; B01J 23/86

[52] U.S. Cl. ............................ 252/446; 252/465; 423/213.5

[58] Field of Search ................. 252/446, 465; 75/124 FA; 423/213.5

[56] References Cited

U.S. PATENT DOCUMENTS

| | | | |
|---|---|---|---|
| 3,027,252 | 3/1962 | McGurty et al. | 75/126 |
| 3,298,826 | 1/1967 | Wukusick | 75/124 |
| 3,591,365 | 7/1971 | Ohmachi | 75/124 |
| 3,920,583 | 11/1975 | Pugh | 252/465 |
| 4,189,405 | 2/1980 | Knapton et al. | 252/465 X |

OTHER PUBLICATIONS

Wukusick, *The Physical Metallurgy and Oxidation Behavior of Fe–Cr–Al–Y Alloys*, U.S. Atomic Energy Commission, Jun. 1, 1966, Contract No. AT(40-1)-2847.

Perkins et al., *Sulfidation–Resistant Alloy For Coal Gasification Service*, U.S. Energy Research and Development Administration, Jun. 14, 1977, Contract No. E(4-9-18)-2299.

*Primary Examiner*—W. J. Shine
*Attorney, Agent, or Firm*—Vincent G. Gioia; James C. Valentine

[57] ABSTRACT

A system comprising a ferritic stainless steel substrate having a tightly adherent oxide coating and a catalytic material thereupon. The ferritic stainless steel is of a chemistry which forms a tightly adherent non-spalling scale suitable for application of a catalytic bearing material. It consists essentially of, by weight, up to 26% chromium, from 1 to 8% aluminum, from 0.02 to 2% hafnium, up to 0.3% yttrium, up to 0.1% carbon, up to 2% silicon, balance essentially iron.

10 Claims, No Drawings

FERRITIC STAINLESS STEEL SUBSTRATE FOR CATALYTIC SYSTEM

The present invention relates to a substrate for a catalytic material.

As the particular material used as a substrate for the catalyst in automotive catalytic convertors effects the performance of the convertors, there is a need to develop improved substrates. In particular, there is a need for a metallic substrate to replace the ceramic substrates presently in use. Ceramic substrates do not have the mechanical properties; e.g. shock resistance, of metallic substrates. Ceramic substrates are, in addition, inherently thicker than are metallic substrates.

A particular metallic substrate is described in U.S. Pat. No. 3,920,583. It is a ferritic stainless steel which contains up to 15% chromium, 0.5 to 12% aluminum and 0.1 to 3% yttrium.

Economic and technical problems have been encountered with the use of yttrium, thereby detracting from the benefits of the substrate of U.S. Pat. No. 3,920,583. Yttrium is an expensive material which is not presently available in abundant quantities, and a material characterized by a low recovery rate during melting.

Through the present invention there is provided a metallic substrate which overcomes the difficulties associated with the substrate of U.S. Pat. No. 3,920,583. The present invention relates to a substrate wherein part or all of the yttrium is replaced by hafnium. Hafnium is less expensive than is yttrium, more readily available and characterized by a higher recovery rate during melting.

Other references disclosing ferritic stainless steels with chromium, aluminum and yttrium are U.S. Pat. Nos. 3,027,252, 3,298,826 and 3,591,365, and a report entitled, "The Physical Metallurgy And Oxidation Behaviour of Fe-Cr-Al-Y Alloys" by C. S. Wukusick. The report, dated June 1, 1966, was prepared under United States Atomic Energy Commission Contract No. At(40-1)-2847. None of these references relate to a substrate for a catalytic material.

Another reference entitled, "Sulfidation—Resistant Alloy For Coal Gasification Service", published June 14, 1977, discloses the use of ferritic stainless steel with chromium, aluminum, and hafnium in $H_2S$ bearing coal gasification atmospheres. It was prepared by Roger A. Perkins and M. S. Bhat for the U.S. Energy Research And Development Administration under contract No. E(49-18)-2299. As with the references discussed in the preceding paragraph, it does not pertain to substrates for catalytic materials. Automotive exhausts are significantly different from the atmospheres encountered in coal gasification.

It is accordingly an object of the subject invention to provide a substrate for a catalytic material.

The present invention is described in terms of a catalytic system comprising a ferritic stainless steel substrate having a tightly adherent oxide coating and a catalytic material thereupon. The ferritic stainless steel is of a chemistry which forms a tightly adherent non-spalling scale suitable for application of a catalytic bearing material. It consists essentially of, by weight, up to 26% chromium, from 1 to 8% aluminum, from 0.02 to 2% hafnium, up to 0.3% yttrium, up to 0.1% carbon, up to 2% silicon, balance essentially iron. The substrate is in most instances of a thickness of from 0.0005 to 0.01 inch.

Chromium may be present within the substrate of the present invention as it is known to improve oxidation resistance. A maximum limit is placed thereupon as chromium is expensive and renders the alloy more difficult to process. Chromium is usually present within the range of from 5 to 22%, and preferably within the range of from 12 to 20%.

Aluminum is present as it improves the oxidation resistance of the substrate. A maximum limit is placed thereupon as aluminum, like chromium, is expensive and renders the alloy more difficult to process. Aluminum is preferably present within the range of from 3 to 6%.

Hafnium is present as it stabilizes the aluminum-bearing scale and makes it both tight and adherent. It is less expensive than is yttrium, more readily available and characterized by a higher recovery rate during melting. Hafnium is preferably present within the range of from 0.2 to 1.5%. Maximum limits are imposed as it too is costly, and insofar as there is reason to suspect that the alloy would become more difficult to process with increasing levels thereof.

Although yttrium may be present within the subject invention in amounts as high as 0.3%, it is usually present in amounts of less than 0.1%. The alloy is preferably yttrium free. Yttrium free alloys have at least 0.05% hafnium.

Carbon and silicon are preferably maintained at respective maximum levels of 0.03, such as up to 0.03, and 0.5%. As ferritic stainless steels have inherently high transition temperatures, which rise with increasing carbon levels, low carbon contents should be specified in order to obtain a more ductile material.

The present invention is not dependent upon any particular means for manufacturing the catalytic system described herein. The system can be produced in accordance with the teachings of heretofore referred to U.S. Pat. No. 3,920,583, or by any other process known to those skilled in the art. Platinum, palladium, irridium, rhodium, and alloys thereof, are typical catalytic materials. The catalyst serves to provoke oxidation of partially oxidized hydrocarbons; e.g. CO to $CO_2$.

The following examples are illustrative of several aspects of the invention.

Several 0.002 inch thick Fe-Cr-Al alloys were subjected to a cyclic oxidation test in air at 2300° F. The alloys were alternately resistance heated and cooled. Cycles to failure for each were recorded. Some of the samples had yttrium, some had hafnium and some were free of both yttrium and hafnium. The chemistry of the alloys appears hereinbelow in Table I. The carbon content for each is less than 0.03%.

TABLE I

| Alloy | COMPOSITION (wt. %) | | | | |
|---|---|---|---|---|---|
| | Cr | Al | Y | Hf | Fe |
| A* | 16 | 5 | 0.23 | — | Bal. |
| B | 16 | 5.3 | 0.33 | — | Bal. |
| C | 16 | 5.3 | 0.40 | — | Bal. |
| D | 13 | 4.2 | — | — | Bal. |
| E | 16 | 5.2 | — | — | Bal. |
| F | 16 | 5.3 | — | — | Bal. |
| G | 16 | 5.3 | — | 0.08 | Bal. |
| H | 16 | 5.3 | — | 0.23 | Bal. |
| I | 16 | 5.3 | — | 0.47 | Bal. |
| J | 16 | 5.3 | — | 1.0 | Bal. |

*Powder Metallurgy Heat

The results of the cyclic oxidation tests appear hereinbelow in Table II.

TABLE II

| Alloy | Cycles to Failure* |
|---|---|
| A | 124 |
| B | 161 |
| C | 204 |
| D | 9 |
| E | 27 |
| F | 111 |
| G | 129 |
| H | 200 |
| I | 221 |
| J | 407 |

*Average of several values

From Table II, it is noted that the oxidation of Alloys A, B and C with yttrium is superior to that for Alloys D, E and F which were devoid of both yttrium and hafnium, and that Alloys G, H, I and J with hafnium fared as well as did Alloys A, B and C. The results clearly show that iron-chromium-aluminum alloys with hafnium can be used as substrates for catalytic materials.

It will be apparent to those skilled in the art that the novel principles of the invention disclosed herein in connection with specific examples thereof will support various other modifications and applications of the same. It is accordingly desired that in construing the breadth of the appended claims they shall not be limited to the specific examples of the invention described herein.

We claim:

1. In a system comprising a ferritic stainless steel substrate having a tightly adherent oxide coating and a catalytic material thereupon, said ferritic stainless steel being of a chemistry which forms a tightly adherent non-spalling scale suitable for application of a catalytic bearing material; the improvement comprising a ferritic stainless steel substrate consisting essentially of, by weight, up to 26% chromium, from 1 to 8% aluminum, from 0.02 to 2% hafnium, up to 0.3% yttrium, up to 0.1% carbon, up to 2% silicon, balance essentially iron.

2. The system according to claim 1, wherein said ferritic stainless steel substrate has from 5 to 22% chromium.

3. The system according to claim 2, wherein said ferritic stainless steel substrate has from 12 to 20% chromium.

4. The system according to claim 1, wherein said ferritic stainless steel substrate has from 3 to 6% aluminum.

5. The system according to claim 1, wherein said ferritic stainless steel substrate has from 0.2 to 1.5% hafnium.

6. The system according to claim 1, wherein said ferritic stainless steel substrate has less than 0.1% yttrium.

7. The system according to claim 1, wherein said ferritic stainless steel substrate has up to 0.03% carbon.

8. The system according to claim 1, wherein said ferritic stainless steel substrate has from 12 to 20% chromium, from 3 to 6% aluminum, from 0.2 to 1.5% hafnium and up to 0.03% carbon.

9. The system according to claim 1, wherein said ferritic stainless steel substrate is devoid of yttrium and wherein said substrate has at least 0.05% hafnium.

10. The system according to claim 9, wherein said ferritic stainless steel substrate has from 12 to 20% chromium, from 3 to 6% aluminum, from 0.2 to 1.5% hafnium and up to 0.03% carbon.

* * * * *